Nov. 24, 1959    E. G. BURNLEY    2,914,277
CAR CABANA ANCHOR AND PLACEMENT GUIDE
Filed Jan. 13, 1956

Edward G. Burnley
INVENTOR.

BY Loyal J. Miller
ATTORNEY

United States Patent Office 2,914,277
Patented Nov. 24, 1959

2,914,277

CAR CABANA ANCHOR AND PLACEMENT GUIDE

Edward G. Burnley, Oklahoma City, Okla.

Application January 13, 1956, Serial No. 558,894

1 Claim. (Cl. 248—39)

The present invention relates to automotive accessories or equipment, and more particularly to a device to be connected to the bumper of an automobile for vertically supporting tent poles, umbrellas, and the like.

Some motorists desire to carry a small tent or cabana while traveling, in order to provide a sun shade or shelter when camping out. Some difficulty is often experienced in providing sufficient rigidity to maintain the tent poles erect, particularly in sandy soil such as is encountered on beaches and the like.

It is therefore the principal object of this invention to provide an anchor and guide which may be removably connected to the bumper of an automobile for vertically supporting and guiding and properly positioning at least two of the poles of a tent or cabana up-right.

Another object is to provide a device of this class which may be quickly and easily assembled and connected to the bumper of an automobile without the use of tools.

An additional object is to provide a device of this class which, when assembled, is substantially equal to the width of an automobile, and which may be easily disconnected medially its ends for convenience in transporting the same in the automobile.

A further object is to provide a device having a clamping arrangement by which the same may be quickly and easily connected to any type of automobile bumper.

Another object is to provide a device of this class having a pole supporting and binding ring adjacent each end thereof which may quickly be positioned horizontally for receiving a tent pole therein after being connected to a bumper.

The present invention accomplishes these and other objects by providing a pair of tubular members removably connected in end abutting aligned relation. A pole supporting ring is rigidly connected to the free end of each respective member and projects laterally therefrom. Clamping means connects the assembled tubular members in longitudinal relation with the upper edge of an automobile bumper.

Other objects will be apparent from the following description when taken in conjunction with the accompanying single sheet of drawings, wherein.

Like characters of reference designate like parts in those figures of the drawings in which they occur.

In the drawings.

Figure 1:
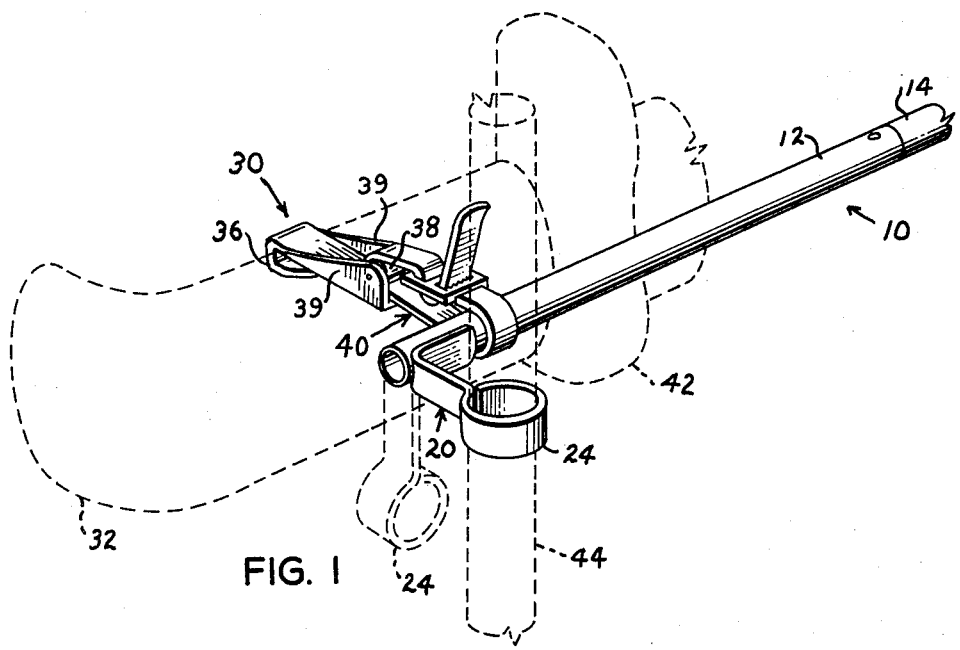
Figure 1 is a fragmentary perspective view of one end of the device installed on an automobile bumper for holding a tent pole, the bumper and pole being shown in dotted lines, and illustrating, in dotted lines, the movement of the pole holding ring.

The reference numeral 10 indicates the device, as a whole, comprising a pair of tubular members 12 and 14 joined in end abutting longitudinal alignment by a cylindrical core 16 rigidly connected, as by welding, to the bore of one end of the member 14. Substantially one-half of the core 16 projects beyond the adjacent end of the member 14 and is closely received by one end of the member 12. The core 16 is drilled and provided with a spring actuated pin 18 which enters a co-operating perforation in the wall of the member 12 for holding the same on the core. The core 16 may be of any desired length as long as it provides sufficient bearing surface in co-operation with the bore of the members 12 and 14 to maintain the same in rigid alignment. Lengthwise the members 12 and 14 are substantially equal and, when assembled, substantially equal the distance between two poles of a tent, not shown, which the device supports vertically in a manner more fully disclosed hereinbelow.

Figure 3:
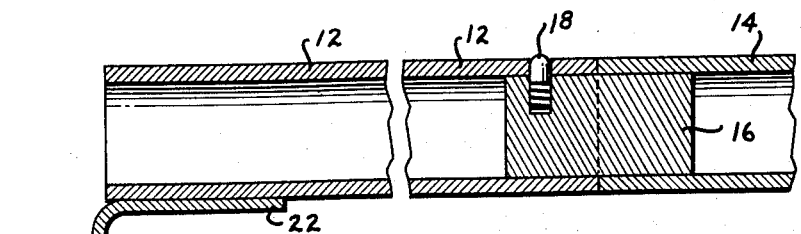

An arm comprising a length of strap metal 20 has the flat surface of one end portion 22 rigidly connected, as by welding, to the surface of the free end of each member 12 and 14, respectively. The free end of the strap metal extends outwardly a selected distance from the adjacent end of the respective tubular member in right angular relation thereto and is circularly formed to describe a ring or loop 24. The ring 24 may be formed separately and welded to the arm 20 if desired. The ring 24 may be formed as shown in Fig. 3, or closed and welded to add to its rigidity if desired. The size of the ring 24 is such that it snugly receives the exterior of a tent pole therein, as disclosed hereinbelow. Similarly the strap 20 may be connected to the tubular members 12 and 14 by riveting or bolting, not shown, if desired. The spacing of the ring 24 from the adjacent end of the tubular member may be lengthened or shortened as desired, as long as sufficient space remains between the ring 24 and the tubular member to allow a tent wall to be fastened between the two. The spacing from center to center of the rings 24, when the tubular members are assembled, is substantially equal with relation to the desired spacing between the first two poles of a tent, not shown, which are to be supported by the device.

Two sets of clamping means 30 connect the device 10 to an automobile bumper 32. One of the clamping means 30 is shown installed in Fig. 1. The clamping means 30 includes a selected length of tool or high carbon steel 34, rectangular in cross section and having a J-shaped hook 36 formed at one end thereof. The clamp 30 is transversely widened longitudinally adjacent the end opposite the hook and a longitudinal portion of each side 39 is turned or bent at right angle with relation to the body of the clamp to form a U-shaped end portion. A roller 38 is transversely journaled on a horizontal axis between the legs 39 of the U-shaped end. An adjustable flexible element, such as a strap and buckle 40, is looped through the clamp 30 around the roller 38 and around the respective tubular member adjacent the free end thereof.

*Operation*

Figure 2:
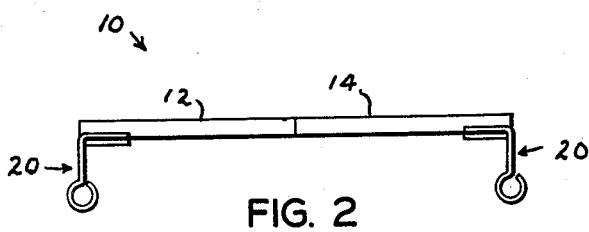
Figure 2 is an elevational view of the device, per se, with the clamping means removed; and, Figure 3 is a fragmentary sectional view of the device.

The tubular members 12 and 14 are joined, as shown in Fig. 2, and one clamping means 30 is placed adjacent the free end of each member 12 and 14, respectively. The hook 36 is engaged over the upper edge of the bumper 32. The straps 40 are then tightened until the members 12 and 14 contact the bumper guards 42 carried by the bumper. Thus the device 10 will be disposed horizontally and substantially parallel with relation to the bumper 32, and, when first installed, the rings 24 will normally be disposed downwardly, as is shown by dotted lines in Fig. 1. The rings 24 are manually raised to substantially a horizontal position, as shown by solid lines. As the ring 24 is raised, the tubular members 12 and 14 rotate against bumper guards 42 and the flexible strap 40 rotates the roller 38. Friction of the straps 40 around a portion of the periphery of each tubular member 12 and 14 of the members contacting the bumper guards 42 act to maintain the rings 24 horizontally when once so positioned. A tent pole 44 may then be inserted in each respective ring 24. In the position shown by solid lines in Fig. 1, the wall of the ring 24 is disposed vertically and parallel with the longitudinal axis of the tent pole 44, and thus holds the same vertical. While it is desired that the ring 24 will snugly receive the pole 44, it is to be understood that the fit must be sufficiently loose to allow the pole to be manually inserted and removed easily.

It seems obvious that with the device thus connected to an automobile bumper, that a means has been provided which rigidly secure and properly position two poles of a tent or cabana. The device 10 is disassembled for transporting the same by depressing the pin 18 and manually pulling the core 16 out of the member 12. It is to be understood many other uses, such as for shade or rain, umbrellas may be easily and successfully installed by my device.

Obviously the invention is susceptible to some change or alteration without defeating its practicability, and I therefore do not wish to be confined to the preferred embodiment shown in the drawings and described herein, further than I am limited by the scope of the appended claim.

I claim:

An anchor and guide for positioning tent poles adjacent an automobile bumper, including: a pair of tubular members removably connected together in end abutting longitudinal alignment and adapted to substantially span the length of an automobile bumper; a strap iron arm rigidly connected at one end to the free end of each of said tubular members, respectively, the free end portion of each said arm being turned laterally outward from the respective said tubular member in right angular relation thereto and arcuately curved adjacent their ends to define a closed ring, said arms and rings being co-operatively aligned horizontally to intersect a common plane, said rings having their respective axes disposed vertically; and adjustable clamp means connected to said tubular members and adapted to be connected to the respective end portions of an automobile bumper, said clamp means including a spring steel substantially J-shaped hook member for engaging with the upper forward edge of the bumper adjacent each end thereof, said hook member having a U-shaped portion adjacent the end of the member opposite the hook; a roller journaled between the legs of said U-shaped portion; and adjustable flexible means carried by each said roller and enveloping a portion of each respective tubular member adjacent the free end thereof for frictionally holding said members adjacent the bumper.

References Cited in the file of this patent

UNITED STATES PATENTS

| | | |
|---|---|---|
| 534,434 | Frost | Feb. 19, 1895 |
| 815,060 | Beebe | Mar. 13, 1906 |
| 1,897,905 | Johnson | Feb. 14, 1933 |
| 2,764,381 | Anderson | Sept. 25, 1956 |